United States Patent [19]
Petro et al.

[11] 3,909,583
[45] Sept. 30, 1975

[54] APPARATUS FOR MANUFACTURING EMBRYONIC WIRE COILS HAVING NODULED ENDS

[75] Inventors: James Petro; Clair M. Rively, both of Little Falls, N.J.

[73] Assignee: Westinghouse Electric Corporation, Pittsburgh, Pa.

[22] Filed: May 30, 1973

[21] Appl. No.: 365,368

Related U.S. Application Data

[62] Division of Ser. No. 163,651, July 19, 1971, Pat. No. 3,792,224, which is a division of Ser. No. 792,988, Jan. 22, 1969, abandoned.

[52] U.S. Cl. ........................... 219/121 L; 140/71.5
[51] Int. Cl.² ........................................ B23K 27/00
[58] Field of Search .......... 219/68, 121 L, 121 LM; 140/71.5; 29/25.18; 214/114; 269/8

[56] References Cited
UNITED STATES PATENTS

| | | | |
|---|---|---|---|
| 3,401,723 | 9/1968 | Petry | 219/68 X |
| 3,454,053 | 7/1969 | Miklos et al. | 140/71.5 |
| 3,597,578 | 8/1971 | Letchworth et al. | 219/121 LM |

Primary Examiner—J. V. Truhe
Assistant Examiner—Clifford C. Shaw
Attorney, Agent, or Firm—D. S. Buleza

[57] ABSTRACT

The tangling of helically coiled wire articles during bulk handling and shipment is prevented by providing integral nodules or beads of fused metal at each end of the articles which enclose the severed ends of the wire. In the case of tungsten wire coils that are designed for use in electric lamps and similar devices and are wound on iron mandrels, the fused beads are composed of tungsten-iron alloy and are formed in situ during coil manufacture by melting the ends of the mandrel with a source of concentrated heat, such as a laser, focused electron beam, plasma torch, or oxy-hydrogen flame. The tungsten-iron alloy beads remain on the end turns of the coil during the subsequent mandrel-dissolving operation, are ductile and are formed without embrittling the tungsten wire. Apparatus for manufacturing such beaded-end coils on a mass production basis using a continuous mandrel-coil stock wire and a laser is disclosed.

8 Claims, 17 Drawing Figures

APPARATUS FOR MANUFACTURING EMBRYONIC WIRE COILS HAVING NODULED ENDS

CROSS-REFERENCES TO RELATED APPLICATIONS

This application is a division of application Ser. No. 163,651 filed July 19, 1971 now U.S. Pat. No. 3,792,224, which application is, in turn, a division of application Ser. No. 792,988, filed Jan. 22, 1969. The latter application has since been abandoned and replaced by continuation application Ser. No. 317,880 filed Dec. 22, 1972 now U.S. Pat. No. 3,778,664.

BACKGROUND OF THE INVENTION

1. Field of the Invention

The present invention relates to the manufacture of coiled articles, such as filament coils for electric lamps, and has particular reference to an apparatus for manufacturing "tangle-free" wire coils.

2. Description of the Prior Art

As is well known, filamentary coils for fluorescent and incandescent lamps are manufactured by winding a tungsten wire around a mandrel of dissimilar metal, such as iron, mechanically cutting the resulting composite wire into segments of the desired length, and chemically dissolving the mandrel to provide the desired individual coils of tungsten wire. In the case of so-called "barrelless" electrode coils currently being used as cathodes in fluorescent lamps, the coil consists of a coiled tungsten core wire that is enclosed in a loose over-winding of fine tungsten wire which provides a "basket-like" structure for the electron-emission material. Since the tungsten core wire is of small diameter, a burr is formed when it is cut during the coil manufacturing operation. Consequently, the burred ends of the loose-fitting core wires protrude from the ends of the coil and are of such size that they snag and interlock with the turns of other coils when such coils are placed in a container or hopper and contact one another. In the extreme, the tangling becomes so complete that it is possible to lift the entire contents of a container that holds hundreds of coils simply by gripping and pulling one end of a single coil.

Because of this inherent tendency of such barrelless fluorescent lamp coils to tangle, it has been extremely difficult to design a satisfactory coil feeder which will automatically separate and supply the coils to a mounting machine. The prior art coils, accordingly, had to be manually separated and fed into the mounting machine. This is a time-consuming tedious operation and materially increases the manufacturing cost of the lamps. In addition, large quantities of finished coils sometimes had to be scrapped during inspection because it was impossible to untangle them. The percent shrinkage is thus very high and further increases the lamp manufacturing cost.

The present invention provides an economical and practical solution to the aforementioned tangling problem and reduces the manufacturing cost of electric lamps by providing an apparatus for making electrode coils which are so conformed that they can be readily separated and fed into the mount-making machine by an automatic coil feeder.

SUMMARY OF THE INVENTION

The aforesaid objectives and other advantages are achieved in accordance with the present invention by providing an integral nodule or bead of fused ductile metal at each end of the coiled articles. In the case of a fluorescent lamp electrode coil of barrelless construction, the ends of the iron mandrel are melted in situ and form pools of molten iron which dissolve the overlying tungsten wire turns, thus producing integral beads of tungsten-iron wire alloy that are fused to and merge with the respective end turns of tungsten wire. The beads are formed in such a manner that the coil turns remain in their original unrecrystallized state. Since the beads contain tungsten, they are not dissolved by the acid used to dissolve and remove the iron mandrel so that the finished coils are terminated by ductile beads that close the respective end turns of the coil and merge with and enclose the severed ends of the tungsten core wire and over-winding of fune tungsten wire. The finished coils can thus be processed, inspected and shipped en masse without becoming tangled or fracturing. Shrinkage during manufacture and handling is drastically reduced and the coils readily separate for automatic feeding into the mount-making machine.

In accordance with the present invention, severing and beading of the coils are achieved simultaneously by an apparatus which indexes a continuous mandrel-coil stock wire in front of a source of concentrated heat (such as a laser), actuates the heat source in timed sequence with the wire-indexing speed so that the mandrel component of the stock wire is rapidly heated at a point located a selected distance from the free end of the wire, and then applies an axial pull on the free end of the stock wire after the mandrel and overlying turns of the coil have melted and formed a pool of molten tungsten-iron alloy. By properly adjusting the wire-indexing speed, the duration and intensity of the heating operation and the timing and speed with which the end segment is pulled away from the stock wire, non-recrystallized mandrel-containing embryonic coils of precisely controlled length with ductile beads formed at each end can be very rapidly produced. These embryonic coils are then immersed in an acid bath which dissolves the iron mandrels and provides finished tungsten electrode coils having beaded ends.

A preferred apparatus for automatically carrying out the aforementioned sequence of steps utilizing cam-operated clamping jaws to feed the stock wire past a laser, and cam-operated switches for controlling the laser and energizing an electromagnetic coil which separates the end segment from the supply of stock wire is provided.

BRIEF DESCRIPTION OF THE DRAWINGS

A better understanding of the invention will be obtained by referring to the exemplary embodiment shown in the accompanying drawings, wherein.

DESCRIPTION OF THE PREFERRED EMBODIMENTS (FIGS. 1–6)

Figure 1:
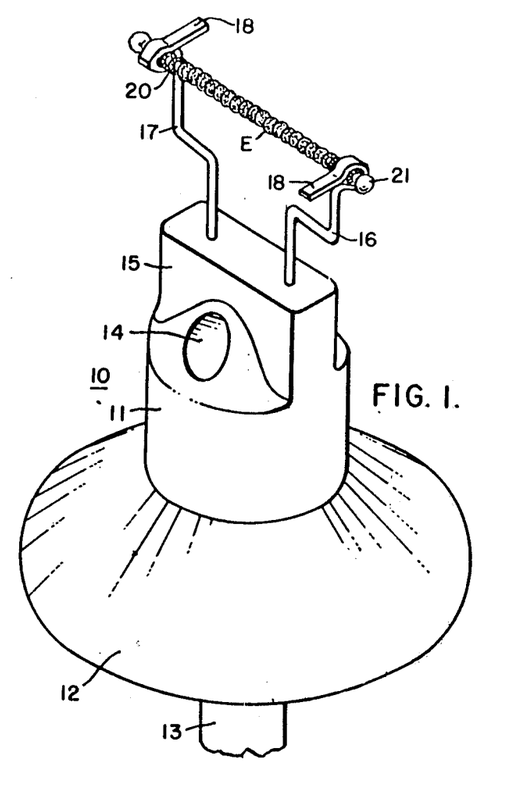
FIG. 1 is an enlarged perspective view of a mount assembly for a fluorescent lamp which incorporates the "beaded-end" electrode provided by the invention.

In FIG. 1 there is shown a mount assembly 10 for a 40 watt T12 fluorescent lamp. The mount 10 consists of the usual glass stem 11 that has a flare 12 at one end and an axially depending glass exhaust tube 13 which extends into the stem tube and, together with an aperture 14 formed in the side wall of the tube, provides a passageway for evacuating and mercury-dosing the lamp after the stem 11 has been sealed into the lamp envelope. A pair of lead wires 16, 17 are hermetically sealed through a press 15 formed on the end of the stem 11 and the ends of the wires are formed into clamps 18. These clamps are closed around the ends of a thermionic cathode consisting of a barrelless electrode coil 20 of non-recrystallized tungsten wire that is coated with a suitable electron-emission material E, such as the well-known mixture of alkaline earth oxides.

As will be noted, each end of the coil 20 is provided with a nodule such as a generally spherical bead 21 of fused ductile metal that extends across the end face of the coil. It will also be noted that the coating E of emission material is confined to the medial portion of the coil 20 and that the coil turns immediately adjacent the clamps 18 are uncoated. Such coils are referred to in the art as barrelless coils because they consist of a plurality of spaced turns that are of the same diameter and thus form a helix that is of linear configuration and the same cross-sectional dimension throughout its length. Such barrelless coils, accordingly, do not have the enlarged secondary turns and medial coil barrel portion characteristic of coiled coil or triple-coiled filaments.

Figure 2:
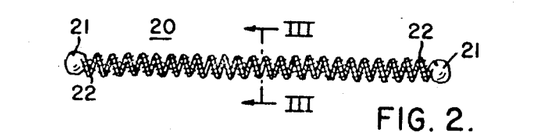
FIG. 2 is a front elevational view of the electrode coil before it is mounted on the lead wires and coated with emission material.

As shown in FIGS. 1 and 2, the beads 21 are integral with and terminate the end turns 22 of the coil 20 and are of approximately the same size as the outer diameter of the coil. The beads 21 accordingly merge with and close the ends of the coil 20.

Figure 3:
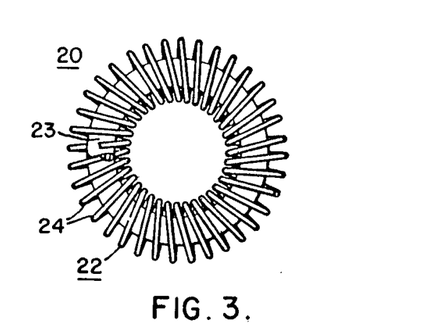
FIG. 3 is an enlarged cross-sectional view through the uncoated coil along the line III—III of FIG. 2.

As illustrated in the enlarged view of the coil 20 shown in FIG. 3, the coil consists of a coiled core wire 23 of suitable refractory material (non-recrystallized tungsten for example) which has a winding of fine refractory wire 24, such as non-recrystallized tungsten, loosely coiled therearound. The turns of the fine wire 24 enclose the core wire 23 and form a basket-like structure or matrix which increases the emission-holding capacity of the coil 20. When the medial portion of the coil 20 is coated with the emission material E after the coil is attached to the lead wires 16, 17, the emission material E fills the matrix formed by the loose overwinding of fine wire 24 and bridges the turns 22 of the coil 20, as is shown in FIG. 1.

Figure 4:
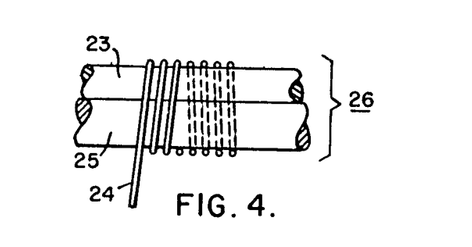
FIG. 4 is an enlarged elevational view of a segment of the composite wire used in making the coil shown in the preceding Figures.
Figure 5:
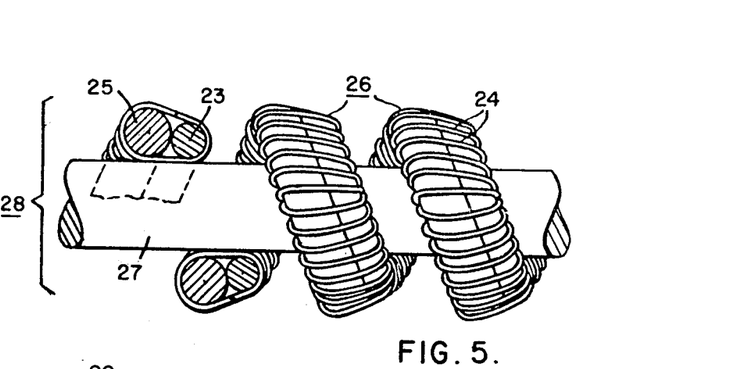
FIG. 5 is an enlarged perspective view of a portion of the aforementioned composite wire after it has been wound around the iron mandrel to form a continuous "stock" wire.

The electrode coil 20 is manufactured by pairing the tungsten core wire 23 with a slightly larger filler wire 25 of dissimilar metal, such as iron, that can be subsequently chemically dissolved from the wound coil without affecting the tungsten core wire. The paired tungsten core wire 23 and iron filler wire 25 constitute a dual-strand core component. The fine tungsten wire 24 is then tightly wound around the paired core wire 23 and filler wire 25 (that is, the aforesaid dual-strand core component) to form the composite wire 26 shown in FIG. 4. This composite wire 26 is, in turn, wound around an iron mandrel 27 at the required TPI to form a continuous coil-mandrel composite 28 shown in FIG. 5. For convenience, this composite 28 is referred to herein as the stock wire.

In the prior art, after the stock wire 28 was mechanically cut into segments of the desired lengths the resulting segments were placed in an acid bath (e.g., hydrochloric acid) which dissolved the iron filler wire 25 and iron mandrel 27 and thus produced a finished coil consisting of the coiled tungsten core wire 23 and loose overwinding of fine tungsten wire 24. Since the tungsten core wire 25 is of such small diameter, it is impossible as a practical matter to mechanically cut it cleanly. As a result, burrs were unavoidably left on the cut ends. Because the core wire 25 is only loosely enclosed by the fine wire winding 24, the burred ends of the core wire naturally protruded from the ends of the finished coils and created the aforementioned snagging and tangling problem when the coils were placed into a hopper and handled en masse.

The aforementioned snagging and tangling problem is solved by melting the ends of the iron mandrel 27, before the latter is chemically removed, and thereby forming an integral nodule or bead 21 of fused ductile tungsten-iron alloy at each end of the segments of stock wire 28. Since the acid that is used to dissolve the iron mandrel 27 and filler wire 25 does not attack tungsten, these tungsten-iron alloy beads 21 remain in place on the end turns of the finished coil 20, as shown in FIGS. 1 and 2, after the iron components have been removed.

When the iron mandrel 27 is melted the resultant pool of molten iron dissolves the overlying tungsten components of the composite wire 26 so that the ends of the core wire 25 and overwound fine wire 24 merge with and are anchored in the respective beads 21. The end turns of the finished coil 20 are thus terminated by globular beads 21 that are substantially smooth and larger than the spacing between the coil turns 22, thereby completely eliminating the troublesome burred ends and interlocking problem characteristic of the prior art coils. The beaded-end coils 20 can, accordingly, be processed and shipped in bulk without the coils snagging one another and becoming entangled. As a result, they can be readily separated and supplied to a mounting machine by a suitably designed automatic coil-feeder.

While various concentrated and controllable heat sources, such as a focused electron beam, a plasma torch or a sharply defined oxy-hydrogen flame, can be used to melt the ends of the iron mandrel 27, a laser beam is preferred since it can be readily focused with great accuracy onto the ends of the iron mandrel.

Figure 6:
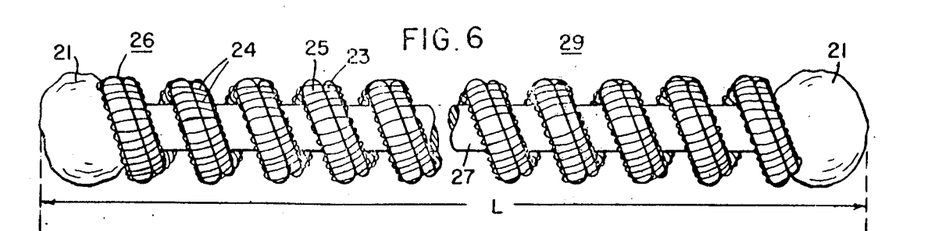
FIG. 6 is an enlarged elevational view of a severed segment of stock wire after the beads have been formed at each end and before the iron mandrel and iron filler wire have been dissolved.

A segment 29 of non-recrystallized stock wire 28 that has enlarged integral beads 21 of ductile tungsten-iron alloy formed on each end by means of a laser beam in accordance with the present invention is shown in FIG. 6. As will be noted, the beads 21 merge and are integral with the ends of the composite wire 26 that is wound about the iron mandrel 27. Such segments 29 are of precisely controlled length L and are, in effect, embryonic coils in that they need only be immersed in an acid bath, washed and dried to be transformed into finished coils.

CONCURRENT BEADING AND SEVERING (FIGS. 7–8)

The beading and severing of the stock wire 28 into segments 29 can be achieved simultaneously by a single operation, if desired. The various stages of such a concurrent beading-severing operation are illustrated in FIGs. 7a to 7b and will now be described.

Figure 7A:
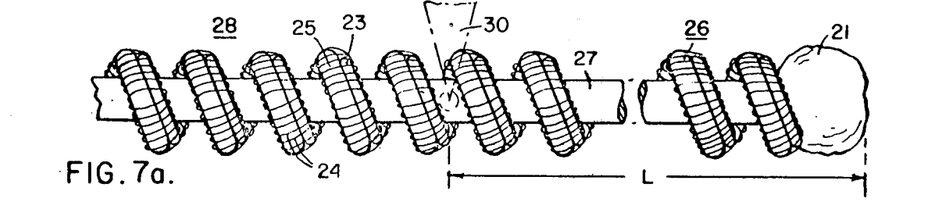
FIGS. 7a to 7d are elevational views of a section of stock wire illustrating the various steps in concurrently beading and severing an embryonic coil segment from the end of a continuous supply of stock wire.
Figure 7B:
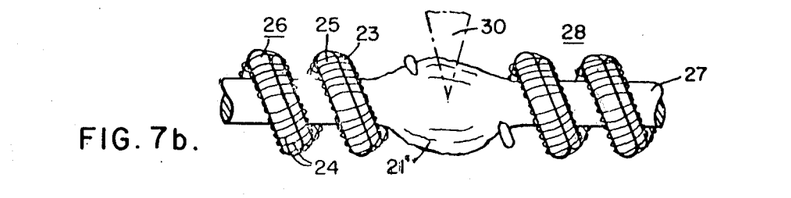
Figure 7C:
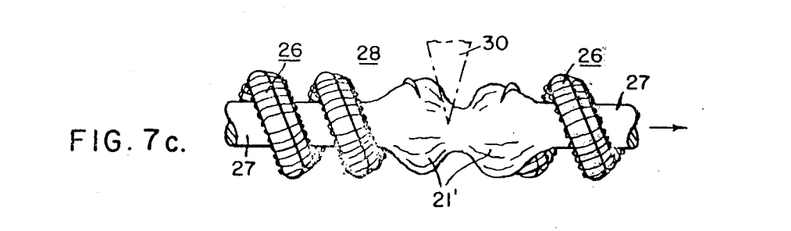
Figure 7D:
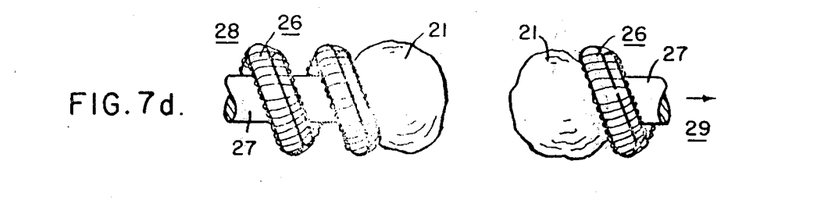

As shown in FIG. 7a, the stock wire 28 is subjected to a laser beam 30 which is focused onto the axis of the iron mandrel 27 at a point located the desired distance L from the end of the bead 21 formed on the free end of the stock wire by the previous beading severing operation. The intense heat generated by the impinging laser beam 30 rapidly melts the iron mandrel 27 and forms a pool of boiling iron which melts the overlying portion of the iron filler wire and the corresponding portions of the tungsten core and fine wires 23, 24 that constitute the composite wire 26. A molten pool 21' of tungsten-iron alloy is thus formed by the impinging laser beam 30, as shown in FIG. 7b. When this occurs a translating force such as an axial pull, indicated by the arrow in FIG. 7c, is applied to the free end of the stock wire 28 which causes the molten pool 21' to begin to subdivide into two globular masses. The axial pull or translating force is maintained until the molten pool of tungsten-iron alloy completely separates. The laser is then turned off and, due to the surface tension of the molten alloy remaining on the severed ends of the stock wire 28, the respective globular masses of molten alloy inherently take the shape of generally spherical beads 21 which are integral and merge with the severed ends of the composite wire 26, as shown in FIG. 7d.

The molten globules of alloy rapidly solidify, thus providing fused tungsten-iron beads 21 on the end of the free end of the stock wire 28 and on the proximate end of the newly-formed segment 29 which has just been severed. The beaded segment 29 (depicted at the right in FIG. 7d) is accordingly identical with the segment 29 shown in FIG. 6 and is of predetermined length L.

Figure 8:
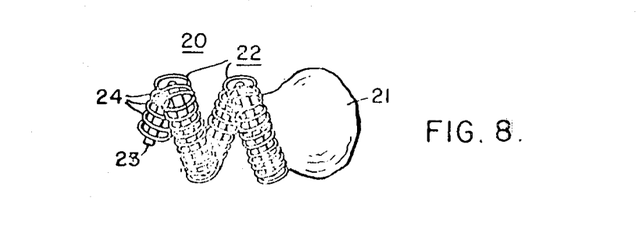
FIG. 8 is a similar view of one end of the finished non-recrystallized tungsten wire electrode coil after the iron mandrel and filler wire have been removed from the severed segment of stock wire.

As illustrated in FIG. 8, the beads 21 merge and are fused with the ends of the tungsten core wire 23 and overwinding of fine tungsten wire 24 in the finished coil 20. The beads 21 thus firmly anchor the tungsten wires in place and provide a smooth rounded closure at each end of the finished coil 20 which is too large to fit between the turns 22 of other such coils and thus inherently prevents coil tangling.

After the severed-beaded segment 29 is withdrawn and deposited in a hopper, the stock wire 28 is advanced a distance L relative to the laser and the operation just described is repeated. If the laser beam intensity and the length of time the laser is energized are properly correlated with the rate at which the stock wire 28 is indexed and the application and strength of the axial pull on the end of the stock wire, the operation can be repeated at a rapid rate to mass produce segments 29 of stock wire that are very uniform in length and beaded at each end. A preferred apparatus which meets each of these requirements is described hereinafter.

It should be noted that the laser beam 30 does not actually cut the stock wire 28 in the strict sense of the term but merely melts the iron mandrel 27 and forms a pool of boiling iron which then dissolves the overlying portions of the composite wire 26 to form a bulbous mass of molten tungsten-wire alloy. The severing of the stock wire 28 is thus actually accomplished by the axial pull exerted on the free end of the stock wire after the molten mass has been formed. This is an important feature of the invention since the temperature of the iron mandrel 27 adjacent the molten pool of tungsten-iron alloy is too low to effect recrystallization of the tungsten in the time it takes to achieve the melting and severing operations. If this were not the case, then the unmelted portions of the tungsten wires 23, 24 would be recrystallized and become brittle with the result that the beaded end turns would fracture and separate from the finished coil 20 unless the latter were very carefully handled.

Preliminary test data indicates that the temperature of the iron mandrel 27 adjacent the molten pool 21' of tungsten-iron alloy is approximately 1400°C whereas the recrystallization temperature of tungsten is about 1900°C. Iron has a melting point of approximately 1535°C. Thus, both the beads 21 and the tungsten wires comprising the turns 22 of the finished coil 20 are ductile and in an unrecrystallized state.

Another important feature of the invention in this regard is the fact that as the molten pool 21' of tungsten-iron alloy forms it grows in size (as shown in FIG. 7b) with the result that it is no longer in focused relationship with the laser beam 30. Thus, heating of the bulbous molten pool is automatically retarded and overheating of the alloy and possible vaporization and crystallization thereof by the laser beam is avoided. In addition, since the composite wire 26 is of a basket-like structure, it tends to hold the molten alloy so that approximately equal amounts of the alloy are retained on the severed ends of the stock wire when separation occurs.

It should also be pointed out that due to the intense heat generated by the impinging laser beam 30, melting and division of the molten alloy pool 21' are achieved almost instantaneously. Hence, the surface tension forces which are produced and the speed with which melting and separation occur prevents the molten metal from falling off the stock wire 28. It has also been found that the time required to melt the iron mandrel 27 and form the molten tungsten-iron pool 21' can be markedly decreased by directing a fine jet of oxygen onto the stock wire 28 at the site of laser beam impingement. The resulting oxidizing atmosphere at the site of melting produces controlled combustion which increases the amount of heat generated during the laser-melting phase of the operation. Accordingly, the preferred method of simultaneously beading and severing includes the use of a controlled jet of oxygen at the melting site.

Analysis of fused tungsten-iron beads formed on the ends of barrelless tungsten electrode coils 20 of the type described shows that the beads consisted of 75% Fe, 20% W and approximately 5% $Fe_2W$ (weight percent). On the basis of a published 38% Fe-W phase diagram by Hansen, it is theorized that approximately only 4.5% (by weight) of the tungsten was in solid solution with the iron and thus constituted a true tungsten-iron alloy. The remainder of the tungsten and iron was not alloyed and compried admixed metal in the form of a two-phase Fe-W casting or body. The term "tungsten-iron alloy" as used herein and in the claims accordingly covers an admixture of Fe and W that is fused but which may or may not contain a true solid solution or alloy of Fe-W.

SPECIFIC EXAMPLE — BARRELLESS COIL

As a specific example of the various values and parameters for those who wish to practice the invention, the barrelless 40 watt fluoroescent electrode fluorescent 20 of the type illustrated and described above has an overall length of approximately eleven-sixteenths inch (17 mm.). The diameter of the iron mandrel 27 is approximately 0.016 inch, the diameter of the iron filler wire 25 is approximately 0.005 inch, the diameter of the tungsten core wire 23 is approximately 0.0023 inch, the diameter of the over-wound tungsten wire 24 is approximately 0.001 inch, and the diameter of the finished coil was approximately 0.03 inch. A 100 watt $CO_2$ laser was employed and its beam was focused into a spot on the iron mandrel that was approximately 0.005 inch in diameter. The wavelength of the radiation produced by the laser was 10.6 microns. The power density of the focused laser beam which impinged upon the iron mandrel was approximately 4 million watts per square inch. The laser was energized for approximately 0.07 second and a pull of approximately 5 ounces was applied to the free end of the stock wire 28 to sever the molten pool of tungsten-iron alloy. The entire beading and severing operation was completed within the time that the laser was energized, that is, within 0.07 second.

Removal of the iron mandrel 27 and iron filler wire 25 from the beaded segments 29 of stock wire 28 was accomplished by immersing the segments in concentrated hydrochloric acid for approximately 30 minutes and the resulting coils were then washed in deionized water and in alcohol and dried.

PREFERRED APPARATUS (FIGS. 9–11)

Figure 9A:
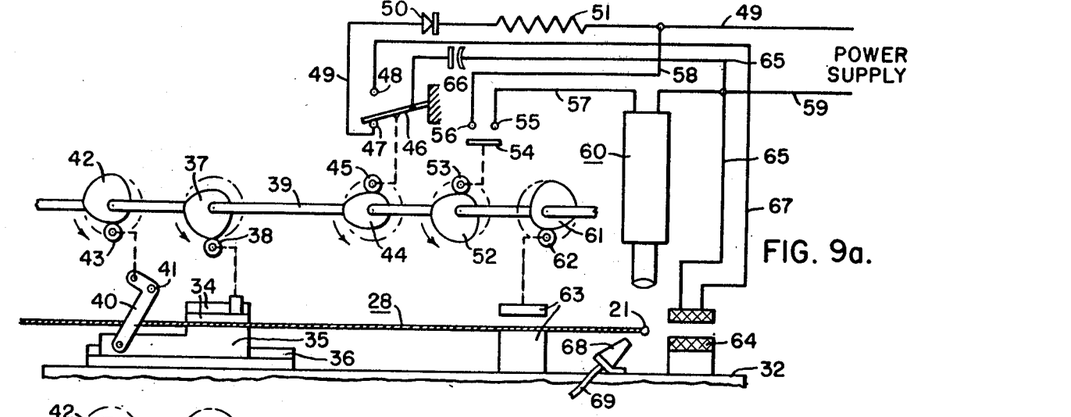
FIGS. 9a to 9d are schematic diagrams of an apparatus and electrical circuit according to the invention for automatically severing a continuous length of stock wire into beaded segments of uniform length by means of a laser, the various operations being shown in sequence as the apparatus indexes through one cycle.

In FIG. 9a there is shown a schematic representation of a preferred apparatus and circuit for severing stock wire 28 into segments 29 of precisely controlled length and concurrently forming tungsten-iron alloy beads on each end of the individual segments in accordance with the present invention. The apparatus comprises a table 32 having a pair of clamping jaws 34 that are mounted on a carriage 35 that is reciprocally movable along a channeled retaining block 26 secured to the table. Only one of the jaws 34 is actuated and this is accomplished by a suitably shaped cam 37 and a cam follower 38 that is coupled to the movable jaw 34 through a suitable linking mechanism. The cam 37 is rotated by a shaft 39 that is driven by a motor (not shown).

Figure 9B:
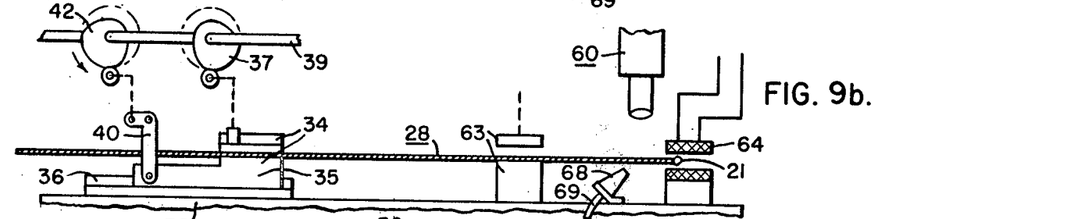
Figure 9C:
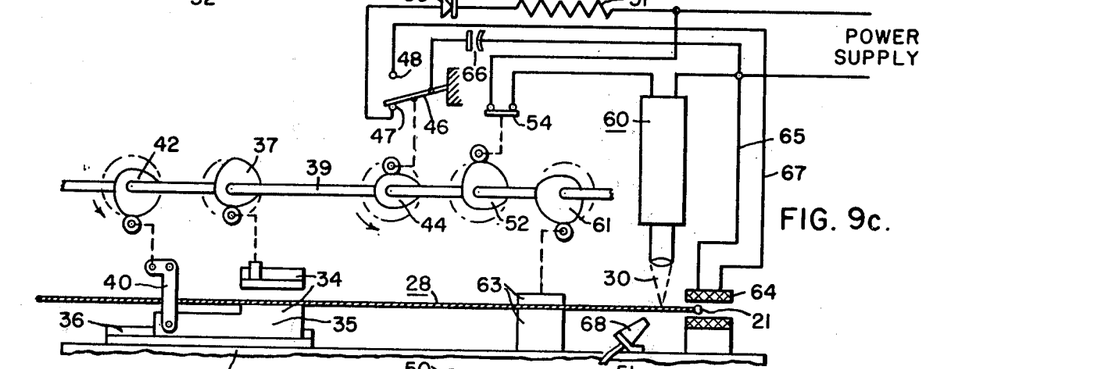
Figure 9D:
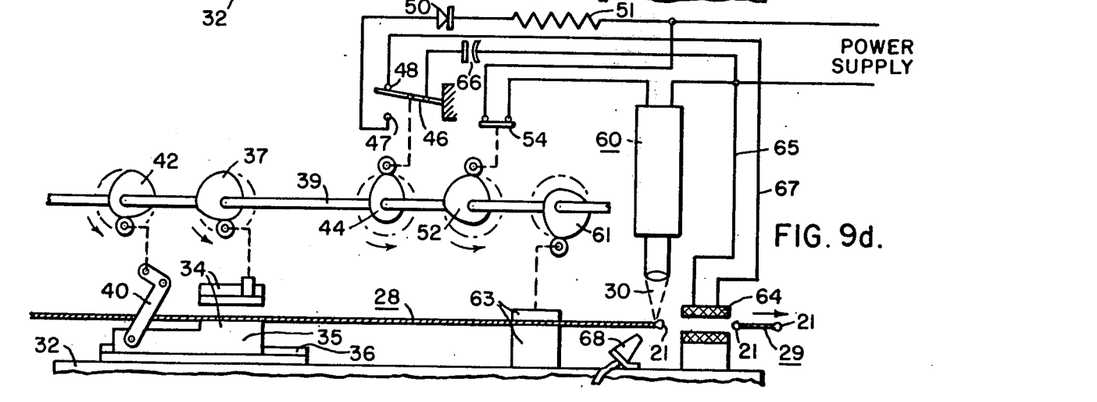

Reciprocal movement of the carriage 35 is achieved by a V-shaped rocker arm 40 that pivots about a stationary pin 41 and has one of its arms coupled to the carriage 35 and its other arm coupled to a second cam 42 through its cam follower 43 and a suitable linkage means. The cam 42 is so contoured that it imparts a cranking motion to the rocker arm 40 which advances the carriage 35 a distance equivalent to the length of the segments 29 into which the stock wire 28 is to be severed, and then returns the carriage to its original position as the cam goes through one revolution. FIG. 9a shows the positions of the various cams and associated parts at the beginning of the cycle immediately after a segment 29 has been severed from one end of the stock wire 28 and ejected. FIGS. 9b–9d show the cams and various operations that take place as the drive shaft 39 has been rotated through 270° in 90° steps.

As is shown in FIG. 9a, a third cam 44 is mounted on the drive shaft 39 and has a cam follower 45 which actuates a switch 46 through a suitable linkage means. The switch 46 engages one of a pair of contacts 47, 48, depending upon the position of the cam 44. At the beginning of the cycle illustrated in FIG. 9a, the switch 46 engages contact 47 which is connected by a conductor 49 to one side of an alternating current power supply through a rectifier 50 and a resistor 51. The other side of the switch 46 is connected to the other terminal of the power supply by a second conductor 65 through a condenser 66. Thus, the switch 46 in its initial position connects the condenser 66 directly to the power supply through the rectifier 50 and resistor 51 and the condenser 66 is thus being charged to a predetermined voltage that is controlled by the values of the rectifier and resistor.

A fourth cam 52 is mounted on the drive shaft 39 and has a cam follower 53 which is mechanically coupled through a suitable linking means to another switch 54 which has a set of contacts 55, 56. Contact 55 is connected by a conductor 57 to one of the power input terminals of a $CO_2$ laser 60 and the other contact 56 is connected by a conductor 58 to conductor 49 and, thus, to one side of the power supply. The other input terminal of the laser 60 is connected to the other side of the power supply by another conductor 59. At the beginning of the cycle illustrated in FIG. 9a, the cam is so oriented that switch 54 is in its "open" position as shown.

A fifth cam 61 is mounted on the drive shaft 39 and its cam follower 62 is mechanically coupled by suitable linkage means to the movable jaw of a second pair of clamping jaws 63 which are mounted on the table 32 at a location adjacent the laser 60 in line with the first set of clamping jaws 34. An annular electromagnet 64 is mounted on the table 32 on the opposite side of the laser 60 from the jaws 63 and is coaxially aligned with the latter and the first set of jaws 34 so as to exert an axial pull on the free end of the clamped stock wire 28 when the magnet is energized. The electromagnet 64 is connected to one side of condenser 66 by conductor 65 and has its other terminal connected to switch contact 48 by a conductor 67.

Thus, when switch 46 subsequently engages contact 48 the electromagnet 64 is connected in series with the condenser 66 which discharges through the electromagnet. This pulse energizes the electromagnet 64 and produces a momentary magnetic field which attracts and exerts an axial force on the adjacent free end to the clamped stock wire 28, as hereinafter described. In the case of the barrelless electrode coil 20 described above in the specific example, the electromagnetic coil consisted of approximately 100 turns of copper wire having a diameter of one-sixteenth of an inch, the condenser 66 had a rating of 2000 mfd, the resistor 51 was a 10 ohm resistor, the rectifier 50 was a commercially available diode rated for 20 amps, and 300 volts, and the power supply was 110 volts A.C.

Summarizing, at the beginning of the cycle depicted in FIG. 9a, cam 42 is so positioned that rocker arm 40 is ready to begin its forward stroke and shift the carriage 35 and pair of jaws 34 mounted thereon a predetermined distance toward the laser 60, cam 37 is positioned so that the jaws 34 are clamped around the stock wire 28, cam 44 is positioned so that switch 46 engages contact 47 and condenser 66 is being charged, cam 52 is positioned so that switch 54 is in its open position and the laser 60 is deenergized, cam 61 is positioned so that jaws 63 are open, and the electromagnet 64 is deenergized since switch 46 is maintained in engagement with contact 47 rather than contact 48 by the action of cam 44.

In order to increase the heating effect of the laser beam on the stock wire 28, a fine jet of oxygen is directed onto the focal point of the laser beam through a nozzle 68 mounted on the table 32. The nozzle is connected to an oxygen supply through a suitable conduit 69.

After the drive shaft 39 and various cams mounted thereon have rotated through an angle of 90°, the cams, jaws, etc. are in the positions shown in FIG. 9b. As illustrated, cam 42 has pivoted the rocker arm 40 which, in turn, has shifted the carriage 35 a predetermined distance toward the laser 60. Jaws 34 remain closed during this inverval and thus index the clamped stock wire 28 the same distance toward the laser 60 so that the beaded free end of the stock wire is advanced a predetermined distance beyond the focal point of the laser. Cam 61 has kept jaws 63 open to permit the stock wire 28 to be so advanced. Cams 44 and 52 (not shown in FIG. 9b) retain switches 46 and 54 in the positions shown in FIG. 9a so that condenser 66 is still being charged and the laser 60 and electromagnetic coil are still deenergized.

After the drive shaft 39 and respective cams have rotated an additional 90° (180° total), as shown in FIG. 9c, cam 42 has allowed the rocker arm 40 to remain stationary so that the carrier 35 is still at the end of its forward stroke. However, cam 37 has opened jaws 34 which thus release the stock wire 28 in readiness for the return stroke of carriage 35 and jaws 34. Cam 44 maintains switch 46 in engagement with contact 47 so that condenser 66 is still charging and the electromagnet 64 is still deenergized. However, cam 52 has actuated and closed switch 54 so that the laser 60 is energized and its focused beam 30 is impinging upon the iron mandrel portion of the stock wire 28 at a point located a predetermined distance inwardly from its previously beaded end 21.

After an additional 90° advance of the drive shaft 39 (that is, after three quarters of a revolution), the cams and associated components are in the positions illustrated in FIG. 9d. Cam 42 has actuated the rocker arm 40 and returned the carriage 35 and jaws 34 to their starting position while cam 37 has retained the jaws 34 in their open position. Cam 44 has actuated switch 46 causing condenser 66 to discharge through the electromagnet 64 and the resulting magnetic field has separated the end segment 29 of the stock wire 28 at the point where it has been melted by the action of the laser beam 30 and has propelled the segment through the annular electromagnet. The laser 60 is maintained in energized condition by the action of cam 52 which still retains switch 54 in its closed position. Clamping jaws 63 are kept closed by cam 61 and thus hold the stock wire 28 stationary during the severing operation. As illustrated, the severed segment 29 of the stock wire has tungsten-iron alloy beads 21 formed at each end and the segment is propelled through the annular electromagnet 64 and falls into a hopper (not shown). A fused tungsten-iron alloy bead 21 is also formed and remains on the free end of the stock wire 28 and the latter is ready to be indexed a predetermined distance beyond the laser 60 for the next severing operation.

As the drive shaft 39 and respective cams 37, 42, 44, 52 and 61 rotate another 90° and complete one revolution, clamping jaws 34 are closed, jaws 63 are opened, switch 46 returns into engagement with contact 47 thus deenergizing the electromagnet 64 and initiating the recharging of condenser 66, and switch 54 returns to the open position deenergizing the laser 60. Thus, at the end of one complete revolution of the drive shaft 39 the various cams clamping jaws and switches are again in the positions shown in FIG. 9a, the laser 60 and electromagnet 64 are deenergized, and the capacitor 66 is starting to recharge and the cycle just described is repeated.

The jet of oxygen flows continuously from the nozzle 68 so that the melting, severing and beading of the stock wire 28 takes place in an oxidizing atmosphere.

It will be apparent from the foregoing description that the cams 37, 42, 44, 52 and 61 operate the clamping jaws 34 and 63 and carriage 35 in timed sequence with the operation of the switches 46 and 54 so that the laser 60 and electromagnet 64 operate in unison with the movement of the stock wire 28 in a repetitive and rapid fashion and sever the stock wire 28 into segments 29 that have beads 21 formed at each end and are of predetermined uniform length. Experience has shown that a machine incorporating the features described will operate at a speed of 400 indexes per minute using a 100 watt $CO_2$ laser and thus produce a corresponding number of segments 29 of beaded embryonic coils (of the type described in the specific example above) in 1 minute when a fine air jet of oxygen is directed into the melting zone. Since the oxygen jet provides controlled combustion in the melting zone, it materially decreases the time required to melt the iron mandrel 27 without increasing the power of the laser. This permits the machine to be operated at a faster index speed than would be the case if the oxygen jet were omitted and melting were performed in an inert nitrogen atmosphere or in air.

Figures 10, 11:
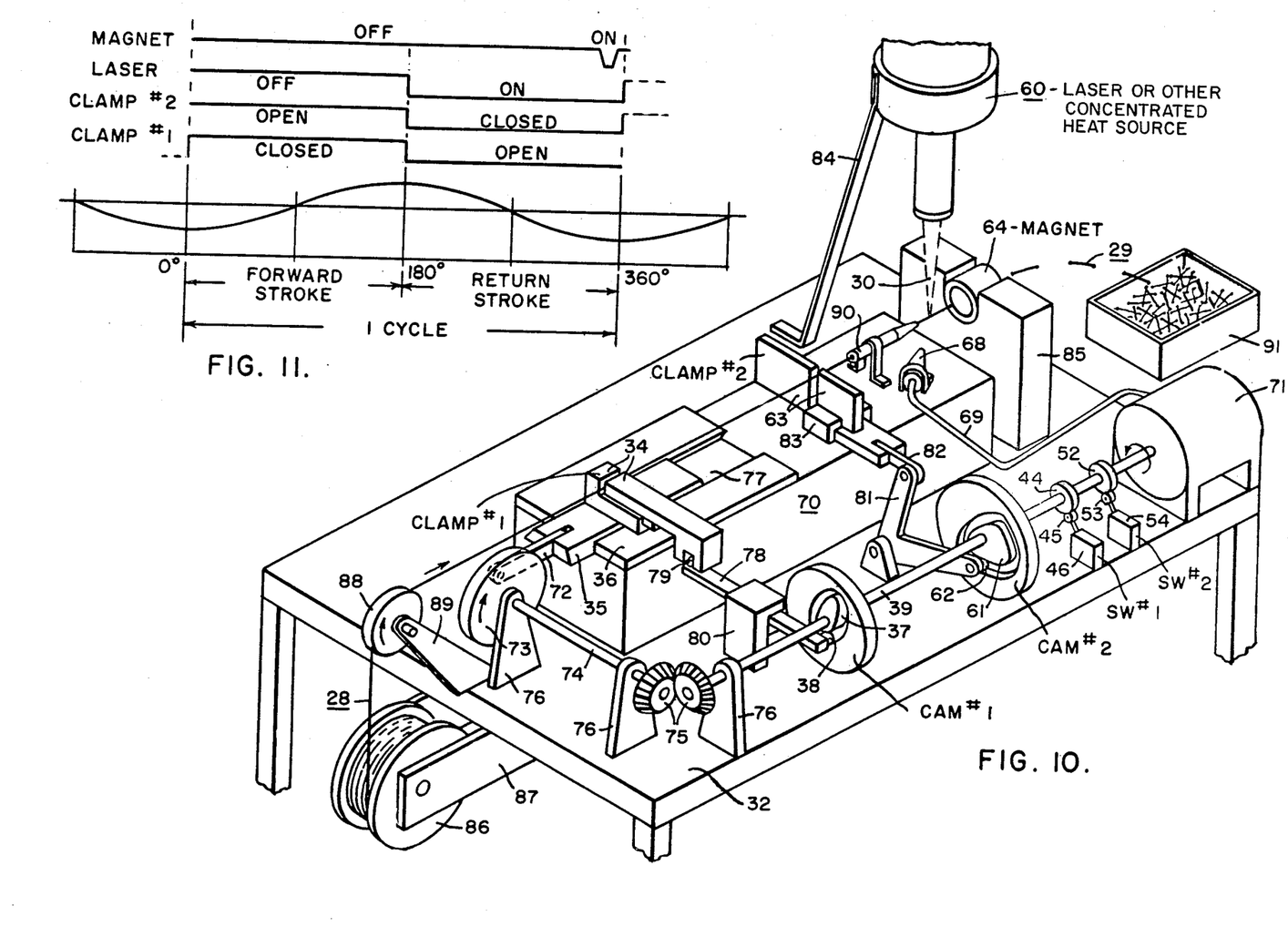
FIG. 10 is a perspective view of a production machine embodying the principles and features shown schematically in the FIGS. 9a to 9d.
FIG. 11 is a phase diagram illustrating the sequence of operation of the various components of the aforesaid machine as the latter indexes through one complete cycle.

An actual production machine that operates in the manner just described is shown in FIG. 10. As illustrated, the machine consists of a table 32 having a centrally located elongated platform 70 on which the clamping jaws 34 and 63 are mounted. A motor 71 secured to one corner of the table 32 rotates the drive shaft 39 which carries the cams 37, 61, 44 and 52. In this embodiment the cam 42, can follower 43, and rocker arm 40 illustrated in the apparatus shown in FIGS. 9a to 9d are replaced by a linking arm 72 that is coupled to the carriage 35 and to a circular drum 73 which is rotated by a shaft 74 driven by the main shaft 39 through a set of bevel gears 75. These shafts are supported and held in operative relationship with one another by brackets 76 that are secured to the table 32 and are provided with suitable bearings which permit the respective shafts to rotate freely.

The linking arm 72 is secured to the drum 73 at a point which is offset from the axis of the drum a distance such that the carriage 35 is first moved forward along a channel 77 in the retainer block 36 a distance that is equal to the length of the segments 29 that are to be severed, and is then returned to its starting position as the drum rotates through 360°. This arrangement is thus functionally equivalent to the cam-rocker arm combination shown in FIGS. 9a–9d.

Cam 37 is identified in the machine shown in FIG. 10 as cam No. 1 and operates the movable jaw 34 through a cam follower 38 that is carried by a connecting rod 78 which is keyed to the end of the movable jaw 34 by a pin and slot arrangement 79. The connecting rod 78 is movably held in operative relation with the cam 37 and movable jaw 34 by a bracket 80 that is secured to the table 32. The clamping jaws 34 (identified in FIG. 10 as clamp No. 1) are accordingly reciprocally movable toward and away from the laser 60 along a prescribed path and can be opened and closed at the beginning and end of the stroke of the carriage 35.

The second set of jaws 63 (identified in FIG. 10 as clamp No. 2) is actuated by coupling the movable jaw to the cam 61 (identified in FIG. 10 as cam No. 2) through its follower 62 and a V-shaped rocker arm 81 that is pivotally mounted on the table 32 and secured to a linking pin 82 carried by the movable jaw 63. The latter is held in operative relationship with the rocker arm 81 and linking pin 82 by a housing 83 secured to the top of the platform 70. Switch 46 (identified in FIG. 10 as switch No. 1) which controls the electromagnet 64 is actuated by a smaller cam 44 of suitable contour and its cam follower 45. Switch 54 (identified in FIG. 10 as switch No. 2) which controls the laser 60 is operated by a similar cam 52 and its cam follower 53.

The 100 watt $CO_2$ laser 60 is supported in vertical position above the table 32 by a bracket 84 and the annular electromagnet 64 is held in aligned relationship with clamps No. 1 and No. 2 by a support block 85 that is secured to the table. The stock wire 28 is wound on a spool 86 that is secured to the underside of the table 32 by means of a bracket 87. The free end of the stock wire 28 is drawn over a pulley 88 that is located directly above the spool 86 and rotatably held in such position by a support arm 89 that is attached to the top of the table 32. The stock wire 28 passes through clamp No. 1 and clamp No. 2 and through a nozzle-shaped wireguide member 90 that is attached to the platform 70 and so oriented that the free end of the stock wire is aligned with the focused laser beam 30 and lies adjacent to and in generally coaxial relationship with the annular electromagnet 64.

The phase diagram of the machine is shown in FIG. 11 and, as illustrated, the various cams and the indexing drive mechanism (linking arm 72 and drum 73) are so designed that when the drive shafts 39, 74 are rotated 180° (the forward stroke of carriage 35), clamp No. 2 remains open and the laser 60 and electromagnet 64 are deenergized. During the next 180° of revolution (that is, the return stroke of the carriage 35), clamp No. 1 is opened, clamp No. 2 is closed, the laser 60 is energized and the electromagnet 64 is momentarily energized at the very end of the cycle. Thus, the stock wire 28 is periodically indexed by the coaction of clamps No. 1 and No. 2 through the guide 90 and predetermined beaded segments 29 are severed from the free end of the stock wire and propelled through the annular electromagnet 64 by its magnetic field into a hopper 91.

While a preferred apparatus for manufacturing beaded coiled articles has been illustrated and described, it will be appreciated that various modifications can be made without departing from the spirit and scope of the invention. For example, the invention is not limited to a machine for beading tungsten coils that are wound on iron mandrels. Any combination of dissimilar metals which, when melted, coact to form beads that are composed of a mixture of the fused metals and do not embrittle the wire coil can be used in the stock wire and processed. Thus, mandrels or inserts of a metal (such as nickel, copper, aluminum, cobalt or titanium) which has a melting point of the same order of magnitude as iron can be used with a tungsten or similar refractory wire coil.

Also, concurrent beading and severing of the stock wire 28 can be achieved by applying an axial pull on the end of the stock wire by a mechanical device instead of the annular electromagnet 64 which is illustrated and described. Such mechanical device can comprise a wire-gripper that is actuated by a suitable camlinkage mechanism in timed sequence with the indexing of the stock wire and operation of the laser 60 to pull and separate the end segment of the stock wire in the same manner as the electromagnet.

The invention can be employed to inhibit tangling of coiled articles which are wound from heavier wire than that used in the filamentary electrode coil 20 disclosed herein and the nodules can be formed on the very ends of the wire. The nodules in this case may be only slightly larger than the wire diameter—the important thing being that the ends of the wire are provided with smooth surfaces which will not snag the turns of other coils and cause the coils to become entangled when placed in a container, or when being processed or handled en masse. The terms "nodule" or "bead" as used herein and in the appended claims accordingly include within their scope a quantity of fused material which provides a generally smooth non-snagging surface at the end of a member, such as a metal wire, which has been wound into a coil.

We claim as our invention:

1. Apparatus for manufacturing embryonic mandrel-containing wire coils having noduled ends from a continuous stock wire comprising a metal mandrel and a wire of dissimilar metal that is wound around said mandrel, which apparatus comprises;

means for holding the stock wire and periodically moving it along a predetermined path relative to a controllable source of heat which provides a concentrated heat zone at a location along said path such that the portions of said stock wire are sequentially positioned in the heat zone established by said heat source when the latter is actuated, means for actuating said heat source for a predetermined period in timed sequence with the operation of said stock wire holding-moving means such that the heat source melts the positioned portion of said stock wire and forms a molten pool of metal while the stock wire is held stationary relative to said heat zone, and means for applying a force to the free end of the stock wire (a) in timed sequence with the operation of said holding-moving means and heat source actuating means such that said force is applied immediately after the said positioned portion of the stock wire is melted and (b) in a direction such that the formed molten pool of metal is divided and separated so that the end segment of the stock wire is thereby severed from the rest of said stock wire and the severed ends of the stock wire are each provided with a nodule of fused metal.

2. The apparatus of claim 1 wherein said forceapplying means comprises an annular electromagnet that is periodically energized in timed sequence with the operation of said stock wire holding-moving means and said heat source actuating means and applies an axial pull on the end segment of the stock wire.

3. The apparatus of claim 1 wherein said controllable heat source comprises an oxy-hydrogen flame.

4. The apparatus of claim 1 wherein said controllable heat source comprises a laser.

5. The apparatus of claim 1 wherein said controllable heat source comprises a laser that has means associated therewith which focuses the laser beam onto the mandrel component of the portions of the stock wire that are sequentially positioned in the laser beam by the stock wire holding-moving means.

6. The apparatus of claim 1 wherein;
said controllable heat source comprises a laser, and
said holding-moving means advances the stock wire along a predetermined path that is substantially normal to the beam generated by said laser.

7. The apparatus of claim 6 wherein means for directing a flow of oxygen onto the portion of the stock wire that is positioned in the laser beam is disposed adjacent said predetermined path.

8. The apparatus of claim 6 wherein;
said laser comprises a $CO_2$ type laser,
said stock wire holding-moving means comprise two sets of clamping jaws that are actuated by cams which are rotated by a common drive shaft, and
the operation of said laser is controlled by a circuit that includes a switch that is operated by a cam which is also rotated by said common drive shaft.

* * * * *